(12) United States Patent
Jang et al.

(10) Patent No.: US 8,977,134 B2
(45) Date of Patent: Mar. 10, 2015

(54) APPARATUS FOR VISIBLE LIGHT COMMUNICATION PROVIDING INTUITIVE INFORMATION AND METHOD USING THE SAME

(75) Inventors: Il-Soon Jang, Daejeon (KR); Dae-Ho Kim, Daejeon (KR); Sang-Kyu Lim, Daejeon (KR); Tae-Gyu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 221 days.

(21) Appl. No.: 13/609,783

(22) Filed: Sep. 11, 2012

(65) Prior Publication Data
US 2013/0004184 A1    Jan. 3, 2013

Related U.S. Application Data

(63) Continuation of application No. 12/846,351, filed on Jul. 29, 2010, now Pat. No. 8,391,720.

(30) Foreign Application Priority Data

Aug. 4, 2009   (KR) .................. 10-2009-0071793
Mar. 2, 2010   (KR) .................. 10-2010-0018600

(51) Int. Cl.
*H04B 10/116*   (2013.01)
*H04B 10/114*   (2013.01)
*H04J 14/02*    (2006.01)

(52) U.S. Cl.
CPC .......... *H04B 10/116* (2013.01); *H04B 10/1149* (2013.01); *H04J 14/02* (2013.01)
USPC .......................................... 398/127; 398/172

(58) Field of Classification Search
USPC .................... 398/128, 130, 127, 172
See application file for complete search history.

(56) References Cited

U.S. PATENT DOCUMENTS 5,371,623 A    12/1994  Eastmond et al.
2005/0058091 A1  3/2005  Rudd et al.
(Continued)

FOREIGN PATENT DOCUMENTS

JP    2007-180826    7/2007
KR    10-0770918     10/2007
(Continued)

OTHER PUBLICATIONS

U.S. Patent Notice of Allowance mailed Nov. 2, 2012 in related U.S. Appl. No. 12/846,351.
(Continued)

*Primary Examiner* — Nathan Curs
(74) *Attorney, Agent, or Firm* — Staas & Halsey LLP

(57) ABSTRACT

There is disclosed a visible light communication technology capable of intuitively recognizing a transmission speed, an alignment status, a communication status, or a transmission rate. A visible light communication apparatus according to an embodiment of the present invention includes: a light source selecting unit selecting at least one light source of a plurality of light sources generating lights having different wavelengths by considering intuitive information distinguished depending on a wavelength in a visible light band; and a visible light communication unit performing visible light communication by at least one selected light source to allow the intuitive information to be recognized by a color corresponding to at least one selected light source. Accordingly, a user using the visible light communication can intuitively know an optimal communication status or transmission speed.

4 Claims, 19 Drawing Sheets

(56) References Cited

U.S. PATENT DOCUMENTS

| 2006/0062582 | A1  | 3/2006  | Suzuki et al. |
| 2008/0094244 | A1* | 4/2008  | Oh et al. ............... 340/815.45 |
| 2008/0131140 | A1  | 6/2008  | Shin et al. |
| 2009/0290628 | A1* | 11/2009 | Matsumoto ............... 375/225 |
| 2009/0312060 | A1* | 12/2009 | Bloebaum et al. ............ 455/566 |
| 2010/0028014 | A1  | 2/2010  | Hosking et al. |
| 2010/0054734 | A1  | 3/2010  | Hosking et al. |

FOREIGN PATENT DOCUMENTS

| KR | 10-2008-0049506 | 6/2008 |
| KR | 10-2009-0005794 | 1/2009 |
| KR | 10-2009-0011203 | 2/2009 |
| KR | 10-2009-0043059 | 5/2009 |

OTHER PUBLICATIONS

U.S. Patent Office Action mailed Jul. 23, 2012 in corresponding U.S. Appl. No. 12/846,351.
U.S. Patent Office Action mailed Jul. 18, 2012 in co-pending U.S. Appl. No. 12/846,359.
U.S. Appl. No. 12/846,351, filed Jul. 29, 2010 Il-Soon Jang et al., Electronics and Telecommunications Research Institute.
U.S. Appl. No. 13/609,766, filed Sep. 11, 2012, Il-Soon Jang et al., Electronics and Telecommunications Research Institute.
U.S. Appl. No. 12/846,359, filed Jul. 29, 2010, Dae-Ho Kim et al., Electronics and Telecommunications Research Institute.
U.S. Patent Office Action mailed Apr. 11, 2014 in co-pending U.S. Appl. No. 13/609,766.
Notice of Allowance mailed Aug. 1, 2014 in co-pending U.S. Appl. No. 13/609,766.

* cited by examiner

APPARATUS FOR VISIBLE LIGHT COMMUNICATION PROVIDING INTUITIVE INFORMATION AND METHOD USING THE SAME

CROSS-REFERENCE TO RELATED APPLICATIONS

This application is a U.S. continuation application filed under 37 CFR 1.53(b) claiming priority benefit of U.S. Ser. No. 12/846,351 filed in the United States on Jul. 29, 2010, now U.S. Pat. No. 8,391,720, which claims earlier priority benefit to Korean Patent Application No. 10-2009-0071793 filed with the Korean Intellectual Property Office on Aug. 4, 2009 and Korean Patent Application No. 10-2010-0018600 filed with the Korean Intellectual Property Office on Mar. 2, 2010, the disclosures of which are incorporated herein by reference.

BACKGROUND

1. Field

The present invention relates to a visible light communication technology, and more particularly, to a visible light communication method and a transmitter/receiver for allowing a user to intuitively know a communication state, a transmission speed, or a transmission rate in visible light communication.

2. Description of the Related Art

Visible light is light having a wavelength in a range that is visible to the human eye among electromagnetic waves, in which the wavelength of the visible light is in the range of 380 to 780 nm. In the visible light, a change in property depending on the wavelength is displayed by colors and the wavelength becomes shorter from a red color to a purple color. Light having a wavelength longer than the red color is referred to as infrared rays and light having a wavelength shorter than the purple color is referred to as ultraviolet rays. Monochromic light emits specific wavelengths ranges for each color, for example, the red color emits between 700 to 610 nm, an orange color emits between 610 to 590 nm, a yellow color emits between 590 to 570, a green color emits between 570 to 500 nm, a blue color emits between 500 to 450 nm, and the purple color emits between 450 to 400. When the colors of the wavelengths are mixed, various colors are seen to the human eye.

Visible light wireless communication as a communication technology using a wavelength in the range of 380 to 780 nm is being standardized by the IEEE 802.15 WPAN (wireless personal area network) and in Korea, a visible light wireless communication task force of the Telecommunication Technology Association (TTA) is in operation.

The visible light communication enables wireless communication while utilizing a light emitting diode (LED)'s unique use such as lighting, etc. as it is. Further, since the visible light communication can be utilized even in an area under communication restrictions such as a hospital or an airplane, the visible light communication is expected to come into the spotlight as the next-generation ubiquitous technology.

In general, a visible communication transmitter/receiver includes a transmitting unit, a receiving unit, and a data transferring unit. The transmitting unit is constituted by light sources converting an electrical signal into a signal of a visible light band and a control unit controlling each light source. The receiving unit is constituted by a photo detector (PD) converting the signal of the visible light band into an electrical signal. The data transferring unit transfers data of an upper layer to be transmitted in each terminal to the transmitting unit and transfers data transferred from the receiving unit to the upper layer.

Environments using the visible communication transmitter and receiver may include an indoor lighting environment using an indoor lighting device, etc. and an outdoor signal lamp environment using a signal lamp, etc. In the visible light communication environment, when the visible light generated by the visible light communication transmitting unit is blocked due to obstacles regardless of an indoor environment or an outdoor environment, the visible light communication cannot be made between the transmitter and the receiver.

In the visible light communication, unlike a communication environment using a radio frequency (RF), the presence or not of obstacles has a significant influence on the communication environment. That is, the visible light communication is made under a line of sight (LOS) environment and unlike the RF communication environment, the location of the receiver may be shifted to a more appropriate location by user's intuitive judgment. Therefore, the visible light communication needs to allow a user to intuitively grasp a receiving angle of the photo detector and interference caused by another adjacent light source.

The related art has introduced a visible light communication apparatus that makes different light intensity in a case of transmitting only a pilot pattern because synchronization between transmission and reception is not made and light intensity when the synchronization is made to transmit data. According to the technology, whether or not transmission and receiving channels are secured and the data is thus transferred can be known by observing the brightness of the visible light, but a data transfer speed or a channel alignment state cannot be known; as a result, whether or not the data is transferred can be grasped by the brightness, thus the grasping is obscure.

Accordingly, the necessity of a new visible light communication technique is acutely on the rise, which allows the user to intuitively and clearly know the data transfer speed or the channel alignment state during communication using the visible light.

SUMMARY

In order to solve the above-mentioned problems, an object of the present invention is to allow a user to visually recognize a data transmission speed by selectively operating light sources to be used for data transmission among light sources generating lights having different wavelengths depending on a channel status and reduce power consumption by preventing an unnecessary light source from being used.

Further, another object of the present invention is to allow a user to secure a better communication channel by enabling the user to intuitively know an alignment state between a visible light communication transmitting device and a visible light communication receiving device.

Yet another object of the present invention is to define the structure of a color packet for effectively implementing intuitive information which a user can intuitively distinguish using colors of lights used in visible light communication.

Still another object of the present invention is to intuitively distinguish a communication status, a channel status, or a file transfer status by using colors of lights used in the visible light communication.

In order to achieve the above objects, a visible light communication apparatus according to an aspect of the present invention includes: a light source selecting unit selecting at least one light source of a plurality of light sources generating lights having different wavelengths by considering intuitive information distinguished depending on a wavelength in a visible light band; and a visible light communication unit performing visible light communication by at least one selected light source to allow the intuitive information to be recognized by a color corresponding to at least one selected light source.

In this case, the intuitive information may be transmitted using a color packet.

In this case, the color packet may include a color packet header and a color packet payload.

In this case, the color packet payload of the color packet may include any one of a dummy color packet pattern and transmission information.

In this case, the color packet including the dummy color packet pattern may be indicated by a color packet indicator in the color packet header and the color packet including the transmission information may be indicated by a peer device information indicator in the color packet header.

In this case, the intuitive information may be channel status information generated based on a received signal characteristic.

In this case, the light source selecting unit may increase the number of light sources to be used for the light visible communication as the channel status is better and decrease the number of light sources to be used for the visible light communication as the channel status is worse. That is, the light source selecting unit may select more light sources to be used for the light visible communication when the channel status is a first channel quality than when the channel status is a second channel quality which is worse than the first channel quality.

In this case, the light source selecting unit may add the light source to be used for the visible light communication among the plurality of light sources in accordance with the priority set according to a receiving sensitivity order at the time of increasing the number of light sources to be used for the visible light communication. That is, the light source selecting unit may select the light source which has the best receiving sensitivity with a top priority when the light source selecting unit increases the light sources to be used for the visible light communication.

In this case, the light source selecting unit may disable a light source having the received signal characteristic which does not satisfy a predetermined reference value among the light sources to be used for the visible light communication.

In this case, the received signal characteristic may be at least one of a Received Signal Strength Indication (RSSI) and a Packet Error Rate (PER).

In this case, the intuitive information may be generated using at least one of the strength of a received signal received from the light source of a visible light communication transmitter and the strength of an interference signal received from an adjacent light source.

In this case, the intuitive information may be differently determined depending on the grade of the strength of the received signal or the strength of the interference signal.

In this case, the intuitive information may be information indicating a communication status of the visible light communication.

In this case, the intuitive information may be transmitted between an idle state and a connection state, between the connection state and a data exchange state, and between the data exchange state and the idle state.

In this case, the intuitive information may be information indicating a file transfer status.

In this case, the intuitive information may be transmitted through a light source having a wavelength within the visible light band, which is different for each transmission rate of the file.

A method for a visible light communication according to another aspect of the present invention includes:

selecting, by a visible light communication transmitter, at least one light source of a plurality of light sources generating lights having different wavelengths by considering intuitive information distinguished depending on a wavelength in a visible light band; and performing, by the visible light communication transmitter, visible light communication using at least one selected light source to allow the intuitive information to be recognized by a color corresponding to at least one selected light source.

In this case, the intuitive information may be transmitted using a color packet, the color packet may include a color packet header and a color packet payload, and the color packet payload may include any one of a dummy color packet pattern and transmission information.

In this case, the color packet including the dummy color packet pattern may be indicated by a color packet indicator in the color packet header and the color packet including the transmission information may be indicated by a peer device information indicator in the color packet header.

In this case, the intuitive information may be any one of channel status information generated based on a received signal characteristic, information representing a communication status of the visible light communication, and information representing a file transfer status.

According to an embodiment of the present invention, it is possible to allow a user to visually recognize a data transmission speed by selectively operating light sources to be used for data transmission among light sources generating lights having different wavelengths depending on a channel status and reduce power consumption by preventing an unnecessary light source from being used.

Further, according to an embodiment of the present invention, it is possible to allow a user to secure a better communication channel by enabling the user to intuitively know an alignment state between a visible light communication transmitting device and a visible light communication receiving device.

In addition, according to an embodiment of the present invention, it is possible to provide an effective structure using a color packet for implementing intuitive information which a user can intuitively distinguish using colors of lights used in visible light communication.

Besides, according to an embodiment of the present invention, it is possible to intuitively distinguish a communication status, a channel status, or a file transfer status by using colors of lights used in the visible light communication.

DESCRIPTION OF EMBODIMENTS

Hereinafter, the present invention will be described in detail with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of elements in the figures may be exaggerated for explicit comprehension.

Hereinafter, preferred embodiments of the present invention will be described in detail with reference to the accompanying drawings.

Figure 1:
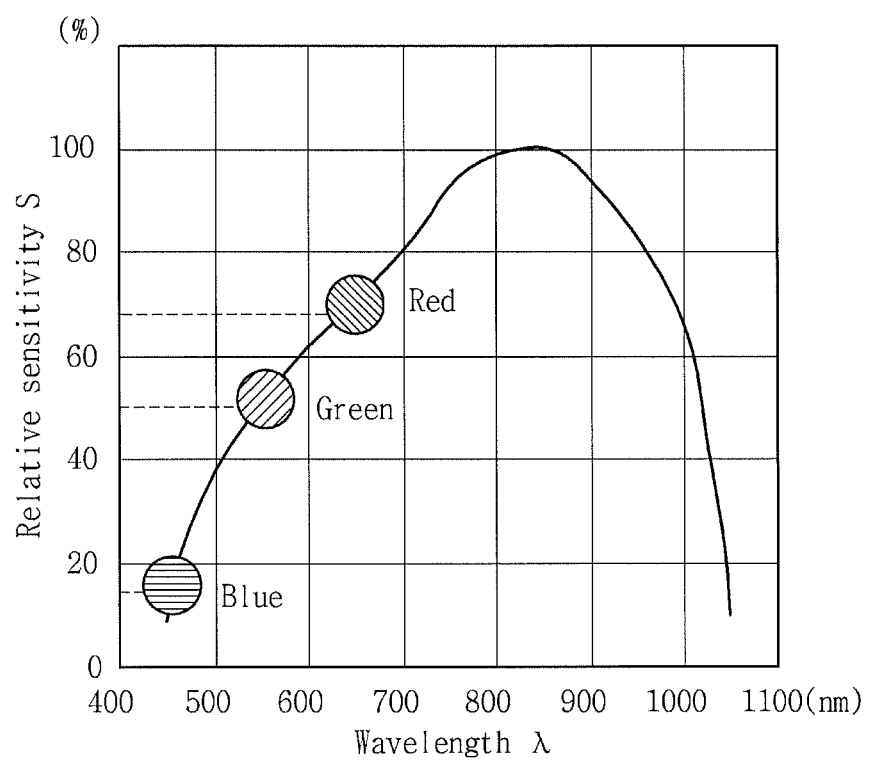
FIG. 1 is a graph showing a relative receiving sensitivity of a photo detector used in a visible light communication receiver depending on a wavelength change of visible light.

FIG. 1 is a graph showing a relative receiving sensitivity of a photo detector used in a visible light communication receiver depending on a wavelength change of visible light.

Referring to FIG. 1, even when all of a plurality of light sources used in a visible light wireless communication transmitter transmit optical data with the same optical power, the photo detector (PD) of the visible light wireless communication receiver does not receive the optical data with the same optical power.

That is, as shown in FIG. 1, when red, green, and blue light sources having the same optical power are used, the red light source has the best receiving performance.

Consequently, in the same channel, the red light source can transmit data, while the blue light source cannot transmit data.

Accordingly, a used light source needs to be changed depending on a channel status in visible light wireless communication and when the used light is changed, a user can distinguish it through a color change and can thus grasp a transmission speed of the visible light wireless communication.

Figure 2:
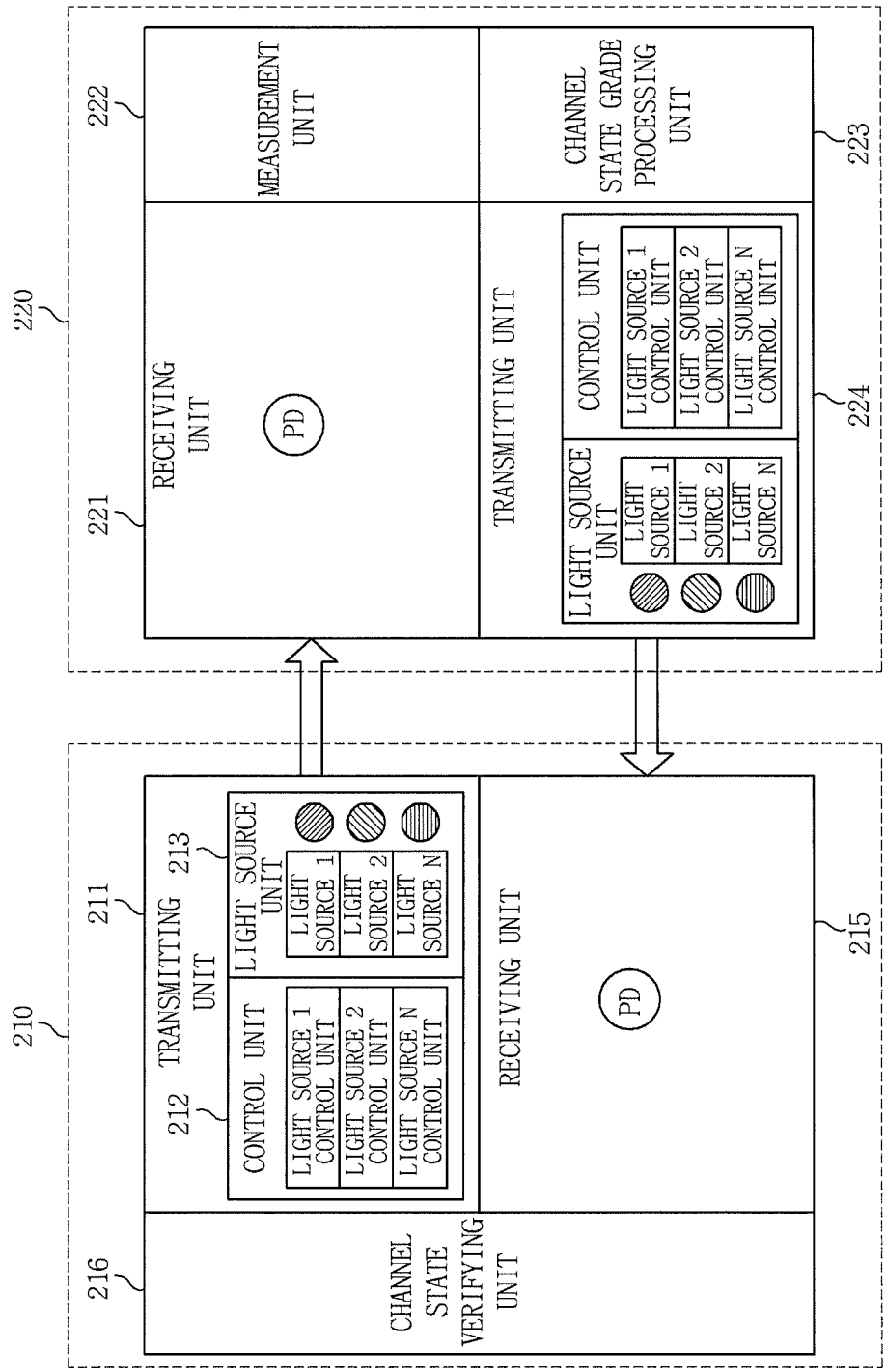
FIG. 2 is a diagram showing selection of a light source in a visible light communication transmitter according to an embodiment of the present invention.

FIG. 2 is a diagram showing selection of a light source in a visible light communication transmitter according to an embodiment of the present invention.

Referring to FIG. 2, a visible light communication transmitter 210 and a visible light communication receiver 220 perform communication by using visible light.

The visible light communication transmitter 210 includes a transmitting unit 211, a receiving unit 215, and a channel state verifying unit 216.

The transmitting unit 211 includes a light source unit 213 including a plurality of light sources generating lights having different wavelengths and a control unit 212 controlling each of the light sources.

The receiving unit 215 is constituted by a photo detector (PD) converting a signal of a visible light band into an electrical signal.

The channel state verifying unit 216 serves to select or deselect the used light source by verifying channel state information transferred from the visible light communication receiver 220.

The visible light communication receiver 220 includes a receiving unit 221, a measurement unit 222, a channel state grade processing unit 223, and a transmitting unit 224.

The receiving unit 221 is constituted by the photo detector converting the signal of the visible light band into the electrical signal.

The measurement unit 222 collects data required to select the light source used in the visible light communication transmitter 210. For example, the measurement unit 222 may measure a Received Signal Strength Indicator (RSSI) and/or a Packet Error Rate (PER).

The channel state grade processing unit 223 determines the grade of a channel state by using the data transferred from the measurement unit 222 and transfers it to the transmitting unit 224 to allow the visible light communication receiver 220 to transfer the data to the visible light communication transmitter 210.

In an example shown in FIG. 2, determining the grade of the channel state is performed by the visible light communication receiver 220, but determining the grade of the channel state may be performed by the visible light communication transmitter 210. That is, the visible light communication receiver 220 provides only a received signal characteristic to the visible light communication transmitter 210 and the visible light communication transmitter 210 may determine the grade of the channel state by using the received signal characteristic or the visible light communication receiver 220 determines the grade of the channel state by using the received signal characteristic and may transfer the determined grade to the visible light communication transmitter 210.

Figure 3:
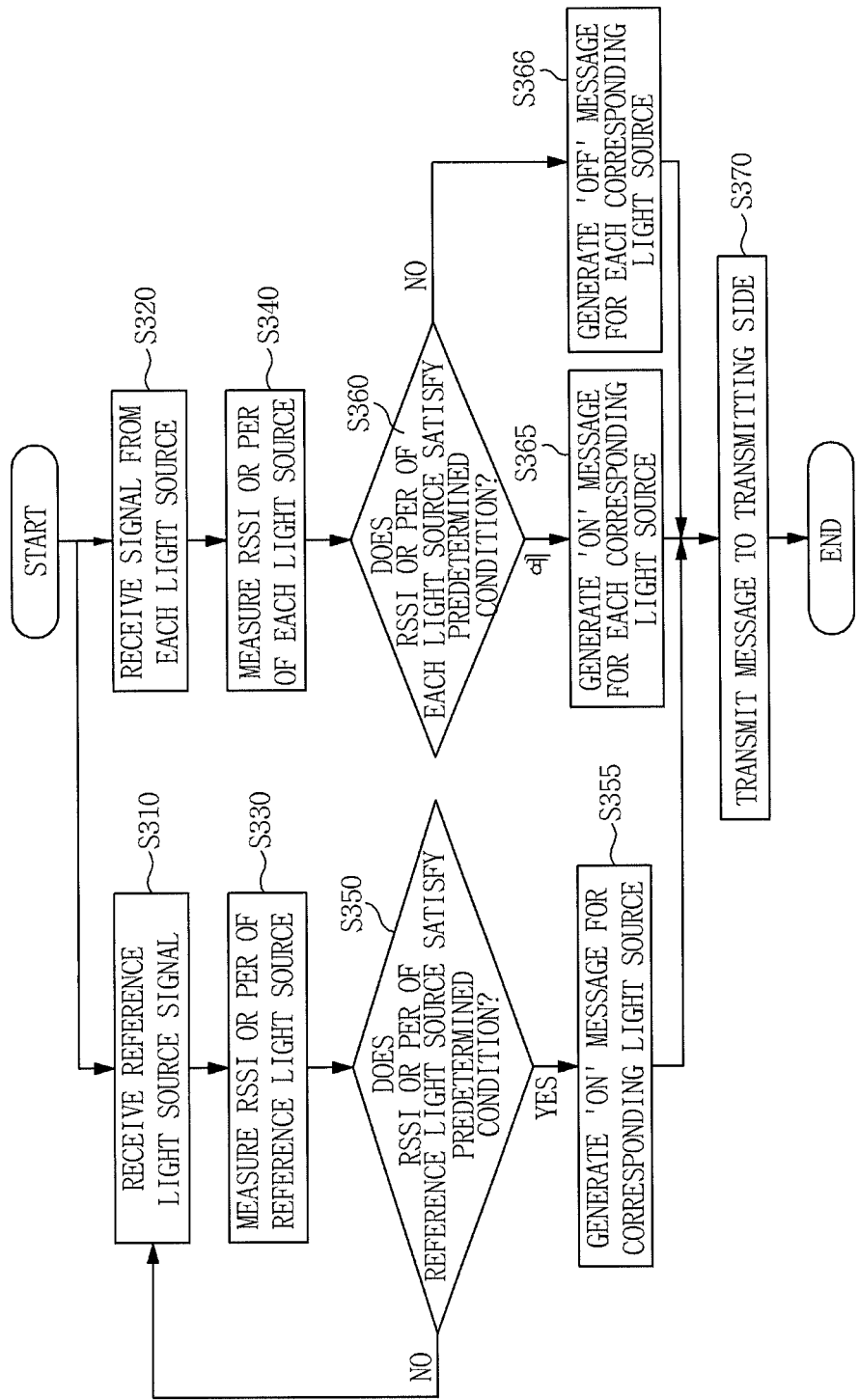
FIG. 3 is an flowchart showing one example of operations of a receiving unit, a measurement unit, and a channel state grade processing unit shown in FIG. 2.

FIG. 3 is an flowchart showing one example of operations of a receiving unit, a measurement unit, and a channel state grade processing unit shown in FIG. 2.

Referring to FIG. 3, the receiving unit receives a signal (pilot signal or data signal) transmitted from the light source of the visible light communication transmitter used in data transmission (S310 and S320).

In this case, the light source of the visible light communication transmitter may be a reference light source generating light (i.e., red light) of highest receiving sensitivity among the plurality of light sources of the visible light communication transmitter.

Basically, transmission/reception of visible light data is started using the reference light source and additional light source is used in accordance with the state of the channel. Therefore, when the light source used in transmission and reception of the pilot signal or data is not present besides the reference light source, steps S320, S340, S360, S365, and S366 shown in FIG. 3 may be omitted.

Further, the measurement unit of the visible light communication receiver measures at least one of the Received Signal Strength Indication (RSSI) of the pilot signal or the data signal received for each light source and the Packet Error Rate (PER) (S330 and S340).

In this case, the measurement unit may measure the received signal strength indication without measuring the packet error rate when only the pilot signal is received. The measurement unit may measure the packet error rate when the pilot signal is not received.

Further, the channel grade processing unit judges whether the received signal strength indication or the packet error rate for each light source satisfies a predetermined condition with respect to a predetermined light source (including the reference light source) (S350 and S360).

In this case, the predetermined condition may be differently set for each light source.

For example, the predetermined condition may represent whether the received signal strength indication of the corresponding light source is a first threshold value or more the packet error rate of the corresponding light source is a second threshold value or less with respect to the predetermined light source (including the reference light source). In this case, the first threshold value and the second threshold value may be different values and the first threshold value and the second threshold value may be differently set for each light source. Further, a plurality of first threshold values and a plurality of second threshold values may be present with respect to the predetermined light source.

The channel grade processing unit may generate a message for adding the light source used in the data transmission by the visible light communication transmitting unit by judging that the channel status is excellent when the received signal strength indication is the first threshold value or more or the packet error rate is the second threshold value or less (S355 and S365).

In this case, the message for adding the light source may be used to add one light source or to add the plurality of light sources. For example, when the received signal strength indication for the reference light source is much higher than the threshold value, the plurality of light sources may be simultaneously added and when the received signal strength indication is a bit higher than the threshold value, only one light source may be added.

With respect to the light source other than the reference light source, the channel grade processing unit judges whether or not the received signal strength indication of the corresponding light source is the first threshold value or more, or the packet error rate of the corresponding light source is the second threshold value or less. According to the judgment result, when the received signal strength indication is the first threshold value or less or the packet error rate is the second threshold value or more (alternately, when the received signal strength indication is the first threshold value or less and the packet error rate is the second threshold value or more), the channel grade processing unit judges that the channel status is fault and thus, may generate a message to disable the corresponding light source to be used for the visible light communication transmitting unit (S366).

Accordingly, according to the embodiment of the present invention, it is possible to optimize consumption of a battery depending on a transmission speed by turning off a light source not required for the data transmission.

The message generated through the channel grade processing unit is transmitted to the visible light communication transmitter through the transmitting unit (S370).

In this case, the message may be transmitted with a wavelength corresponding to the reference light source.

In the visible light communication transmitter receiving the message for adding the light source, the channel state verifying unit verifies the message and adds the corresponding light source to the data transmission.

In an example shown in FIG. 3, the message generated by the channel grade processing unit is on/off information on the predetermined light source, but according to the embodiment, the message generated by the channel grade processing unit is information on the received signal characteristic and on/off information on the predetermined light source may be implemented to be generated in the visible light communication transmitter.

Figure 4:
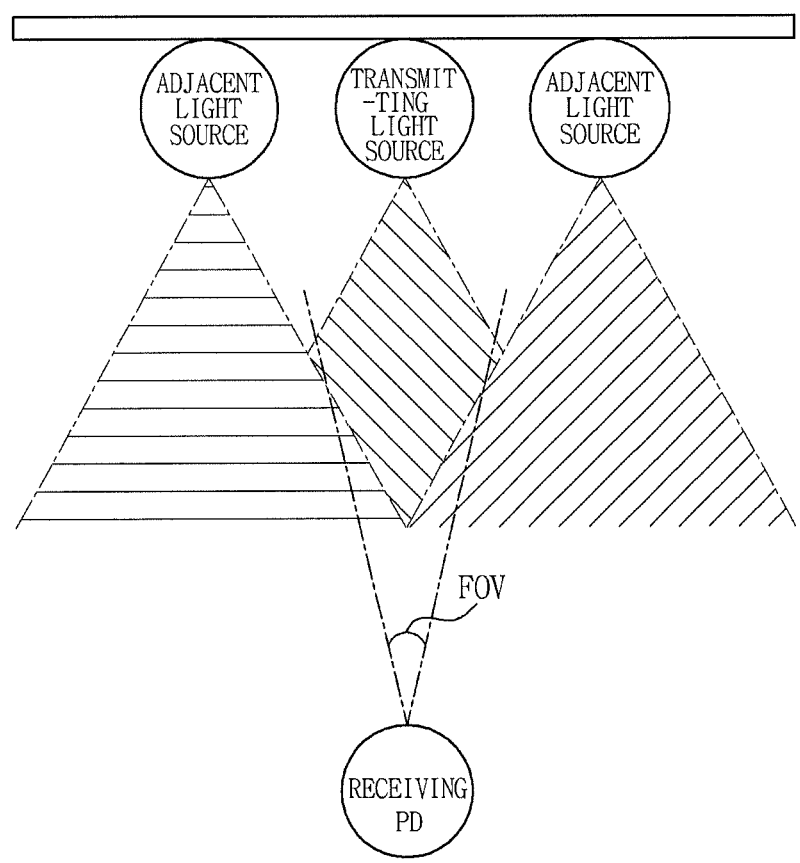
FIGS. 4 to 6 are diagrams showing an influence by a distance between a transmitter and a receiver or alignment of a receiver with respect to a transmitter in a visible light wireless communication system.
Figure 5:
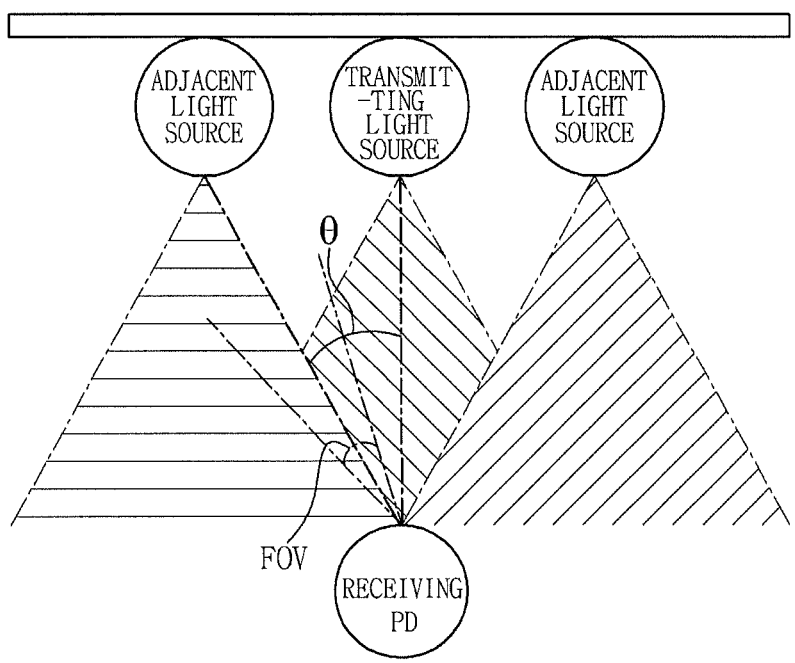
Figure 6:
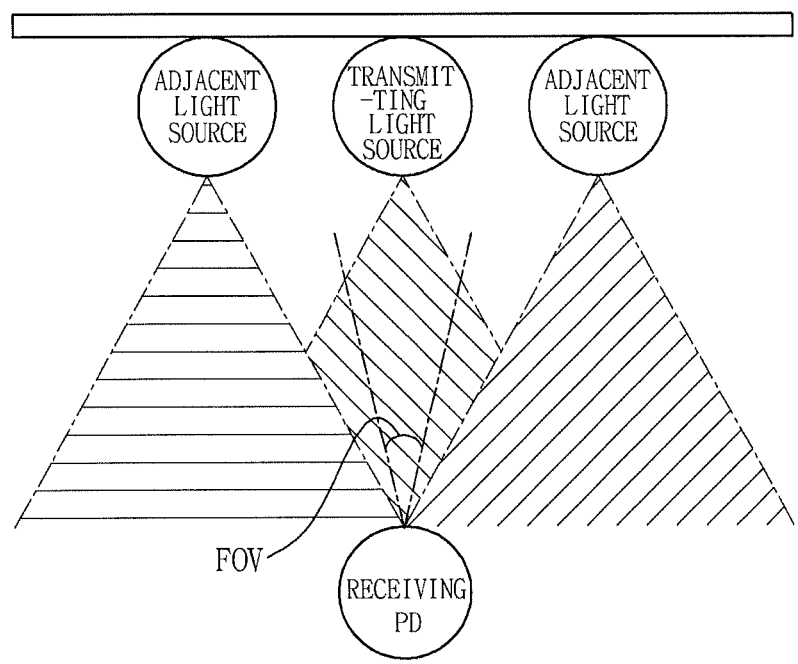

FIGS. 4 to 6 are diagrams showing an influence by a distance between a transmitter and a receiver or alignment of a receiver with respect to a transmitter in a visible light wireless communication system. FOV disclosed in FIGS. 4 to 6 represents the field of view of a receiver.

In FIG. 4, the receiver is aligned to a transmitting light source, but the receiver is too far from the transmitting light source. In FIG. 4, the receiver is aligned to the transmitting light source, but since the receiver is too far from the transmitting light source, optimal received signal power cannot be secured.

In FIG. 5, the receiver is not aligned with the transmitting light source and the alignment is deviated by □. In FIG. 5, the receiver is positioned from the transmitting light source by a proper distance, but since the alignment is deviated, the optimal received signal power cannot be secured.

In FIG. 6, the receiver is positioned from the transmitting light source by the proper distance and the receiver is aligned to the transmitting light source. In FIG. 6, the receiver can secure the optimal receiving power because the receiver is positioned from the transmitting light source by the proper distance and the receiver is aligned with the transmitting light source.

Figure 7:
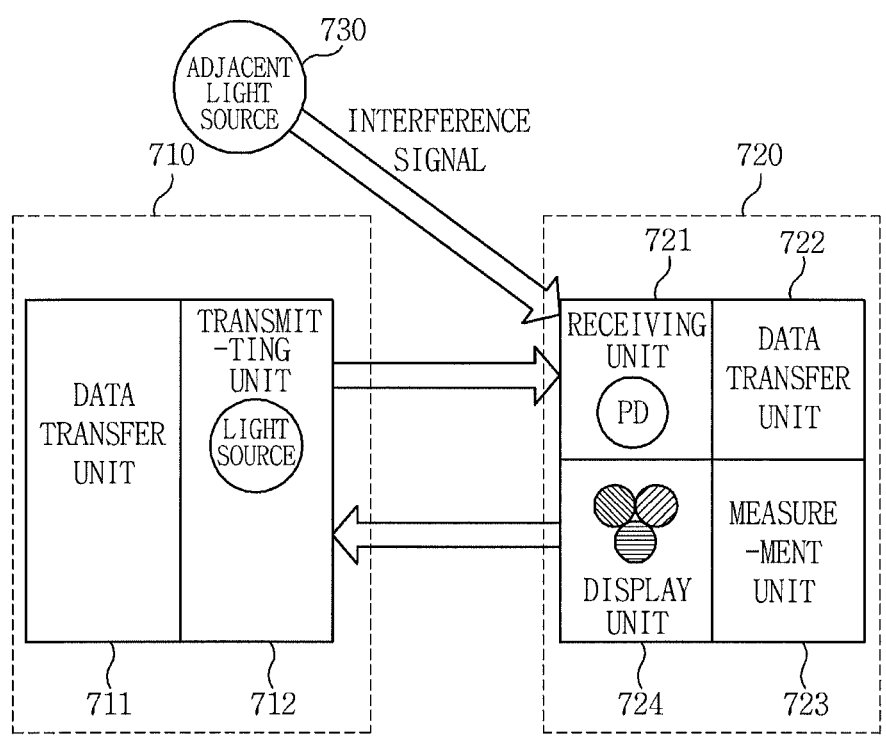
FIG. 7 is a diagram showing an alignment state information displaying function of a visible light communication receiver according to an embodiment of the present invention.

Accordingly, if the user intuitively distinguishes the alignment state, etc. and moves the receiver to optimize the state shown in FIG. 5 or 6 to the state shown in FIG. 7, the receiving performance can be improved.

A distance between the transmitter and the receiver or alignment state information such as alignment of the receiver with the transmitter may be defined by the received signal strength indication of a signal received from the visible light communication transmitter or the strength of an interference signal received form an adjacent light source. For example, the interference signal strength may be a signal to interference ratio (SIR).

FIG. 7 is a diagram showing an alignment state information displaying function of a visible light communication receiver according to an embodiment of the present invention.

Referring to FIG. 7, an adjacent light source 730 has an influence on a visible light communication transmitter 710 and a visible light communication receiver 720's performing the communication by using the visible light.

The visible light communication transmitter 710 transmits data transferred from an upper layer by a data transferring unit 711 to the visible light band by using the transmitting unit 712 including the light source.

The visible light communication receiver 720 receives the signal of the visible light band through the receiving unit 721 including the photo detector, converts the signal of the visible light band into the electrical signal and transfers the converted electrical signal to the upper layer through the data transferring unit 722.

In particular, the visible light communication receiver 720 further includes a measurement unit 723 and a display unit 724. The measurement unit 723 measures the strength of a received signal received from the light source of the visible light communication transmitter 710 through the receiving unit 721 and/or the strength of an interference signal received from the adjacent light source 730.

The display unit 724 displays the alignment state information generated using the strength of the received signal and/or the strength of the interference signal through a display device.

In this case, the alignment state information may be differently determined depending on the grade of the strength of the received signal and/or the strength of the interference signal.

For example, the display unit 724 may display different colors depending on the alignment state. For example, the display unit 724 may select at least one of the plurality of light sources by using the strength of the received signal and the strength of the interference signal or a value calculated using the strengths.

In this case, the display device may be one or more light sources.

Figure 8:
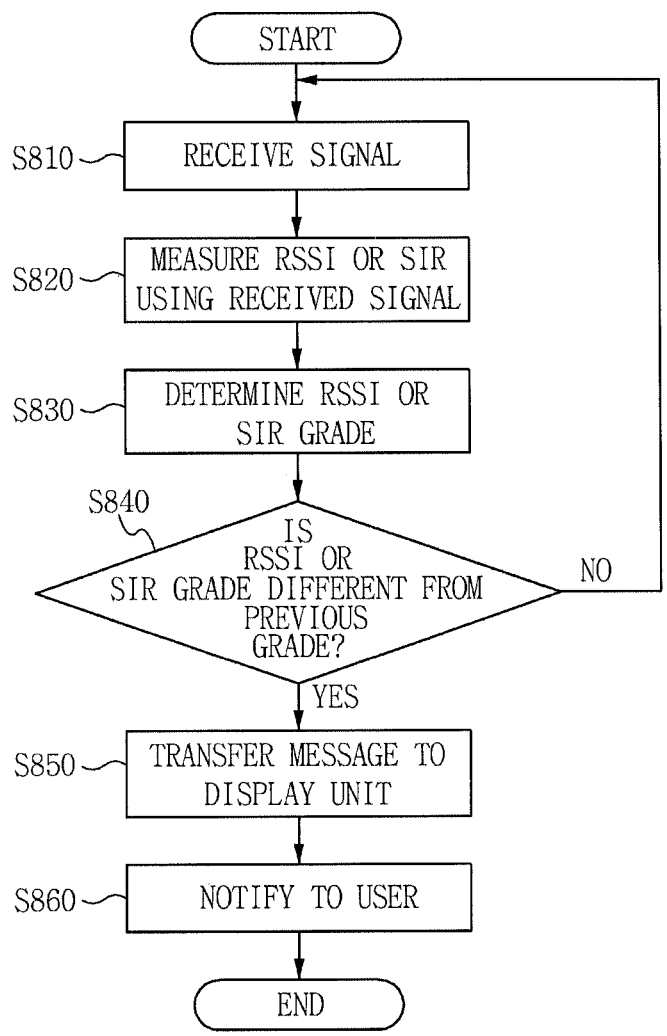
FIG. 8 is an flowchart showing one example of operations of a receiving unit, a measurement unit, and a display unit shown in FIG. 7.

FIG. 8 is an flowchart showing one example of operations of a receiving unit, a measurement unit, and a display unit shown in FIG. 7.

Referring to FIG. 8, the receiving unit receives the signal of the visible light band and converts the received signal into the electrical signal (S810).

Further, the measurement unit measures the strength of the received signal received from the light source of the visible light communication transmitter through the receiver and/or the strength of the interference signal received from the adjacent light source (S820).

Further, the measurement unit generates the alignment state information by using the strength of the received signal and/or the strength of the interference signal (S830).

For example, the alignment state information may be the grade of the strength of the received signal and/or the strength of the interference signal.

Further, the measurement unit judges whether or not the alignment state information is changed (S840).

According to the judgment result of step S840, when the measurement unit judges that the alignment state information is changed, the measurement unit transfers the changed alignment state information to the display unit (S850).

According to the judgment result of step S840, when the measurement unit judges that the alignment state information is not changed, the receiving unit returns to step S810 of receiving the signal of the visible light band and receives the signal of the visible light band.

The display unit displays the transferred alignment state information to the user (S860).

Therefore, the information displayed in the display unit is different depending on the grade of the strength of the received signal or the strength of the interference signal and as a result, the user may intuitively judge the alignment state of the transmitter/receiver.

Figure 9:
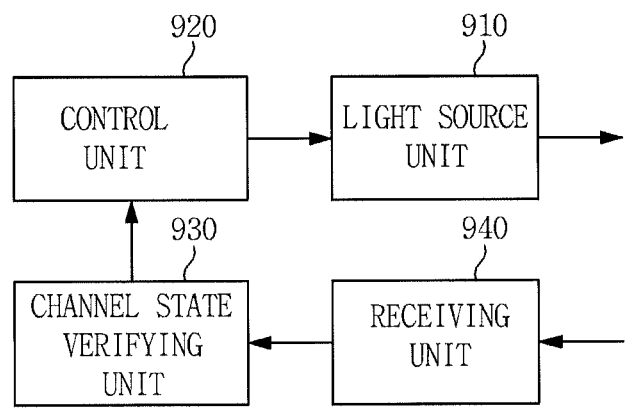
FIG. 9 is a block diagram of a visible light communication transmitter according to an embodiment of the present invention.

FIG. 9 is a block diagram of a visible light communication transmitter according to an embodiment of the present invention.

Referring to FIG. 9, the visible light communication transmitter according to the embodiment of the present invention includes a light source unit 910, a control unit 920, a channel state verifying unit 930, and a receiving unit 940.

The light source unit 910 includes a plurality of light sources generating lights having different wavelengths.

The channel state verifying unit 930 selects at least one light source to be used for the data transmission among the plurality of light sources by considering the channel state information generated based on a received signal characteristic measured by a visible light communication receiver.

In this case, the received signal characteristic may be acquired with respect to a reference light source generating light having a wavelength of the highest receiving sensitivity among the plurality of light sources or may be calculated with respect to each of the light sources used in the data transmission.

For example, the received signal characteristic may be at least one of a Received Signal Strength Indication (RSSI) and a Packet Error Rate (PER).

In this case, the channel state information may be transferred from the visible light communication receiver to the visible light communication transmitter by using a light source having a wavelength corresponding to the reference light source.

In this case, the channel state information may be just information on the received signal characteristic or information for distinguishing the light source to be used for the data transmission. In this case, the channel state information may be on/off information on at least one of the plurality of light sources.

Further, channel state verifying unit 930 may increase the number of light sources to be used for the data transmission as the channel state is better and decrease the number of light sources to be used for the data transmission as the channel state is worse.

In this case, the channel state verifying unit 930 may add the light source to be used for the data transmission among the plurality of light sources in accordance with the priority set according to the receiving sensitivity order at the time of increasing the number of light sources to be used for the data transmission.

In addition, the channel state verifying unit 930 may disable a light source having the received signal characteristic which does not satisfy a predetermined reference value among the light sources to be used for the data transmission to be used for the data transmission.

In this case, the channel state verifying unit 930 may increase the number of light sources to be used for the data transmission when the received signal strength indication is a first threshold value or more or the packet error rate is a second threshold value or less.

In this case, the channel state verifying unit 930 may enable the reference light source to be used for the data transmission before the channel state information is generated.

The control unit 920 controls the light source unit 910 so as to transmit the data by at least one selected light source.

The receiving unit 940 receives the channel state information from the visible light communication receiver and provides the received information to the channel state verifying unit 930.

Figure 10:
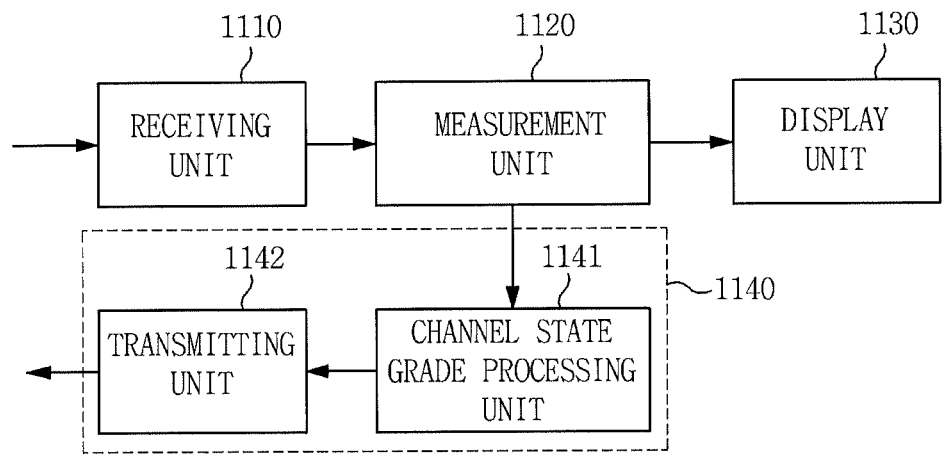
FIG. 10 is a block diagram of a visible light communication receiver according to an embodiment of the present invention.

FIG. 10 is a block diagram of a visible light communication receiver according to an embodiment of the present invention.

Referring to FIG. 10, the visible light communication receiver according to the embodiment of the present invention includes a receiving unit 1110, a measurement unit 1120, a display unit 1130, and a channel sate feed-back unit 1140.

The receiving unit 1110 converts the signal of the visible light band into the electrical signal.

The measurement unit 1120 measures the strength of the received signal received from the light source of the visible light communication transmitter through the receiving unit 1110 and/or the strength of the interference signal received from the adjacent light source.

In this case, the strength of the interference signal includes all information which may be generated using the interference signal strength such as a signal to interference ratio (SIR), etc.

The display unit 1130 displays the alignment state information generated using the strength of the received signal and/or the strength of the interference signal through the display device.

In this case, the alignment state information may be differently determined depending on the grade of the strength of the received signal or the strength of the interference signal.

The channel state feed-back unit 1140 transfers the channel state information generated based on the received signal characteristic to the visible light communication transmitter.

In this case, the channel state information may be used for the visible light communication transmitter to select at least one light source to be used for the data transmission among the plurality of light sources generating lights having different wavelengths.

Further, the channel state information may be transferred to the visible light communication transmitter through the light source corresponding to the wavelength having the highest receiving sensitivity among the plurality of light sources.

In this case, the channel state information may be generated using at least one of the Received Signal Strength Indication (RSSI) and the Packet Error Rate (PER).

The channel state feed-back unit 1140 may includes a channel state grade processing unit 1141 and a transmitting unit 1142.

Figure 11:
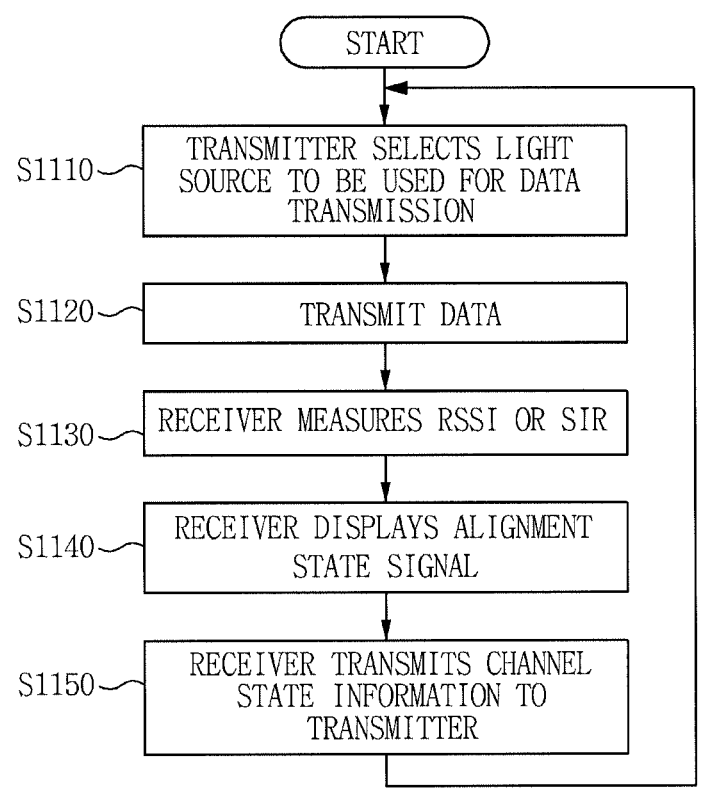
FIG. 11 is an flowchart of a visible light communication method according to an embodiment of the present invention.

FIG. 11 is a flowchart of a visible light communication method according to an embodiment of the present invention.

Referring to FIG. 11, in the visible light communication method according to the embodiment of the present invention, a visible light communication transmitter selects at least one light source to be used for data transmission among a plurality of light sources generating lights having different wavelengths by considering channel state information generated based on a received signal characteristic measured by a visible light communication receiver (S1110).

In this case, at step S1110, before the channel state information is generated, a reference light source generating light having a wavelength with the highest receiving sensitivity among the plurality of light sources may be used in the data transmission.

In this case, at step S1110, the number of light sources to be used for the data transmission may be increased as the channel state is better and the number of light sources to be used for the data transmission may be decreased as the channel state is worse and the light source to be used for the data transmission among the plurality of light sources may be added in accordance with the priority set according to the receiving sensitivity order at the time of increasing the number of light sources to be used for the data transmission.

Further, the visible light communication transmitter transmits the data to the visible light communication receiver by at least one selected light source (S1120).

Further, the visible light communication receiver measures at least one of the strength of the received signal received from the light source of the visible light communication transmitter and the strength of an interference signal received from an adjacent light source (S1130).

Further, the visible light communication receiver displays alignment state information generated using the strength of the received signal and/or the strength of the interference signal through a display device (S1140).

In addition, the visible light communication receiver transmits the channel state information generated based on the received signal characteristic to the visible light communication transmitter (S1150).

Figure 12:
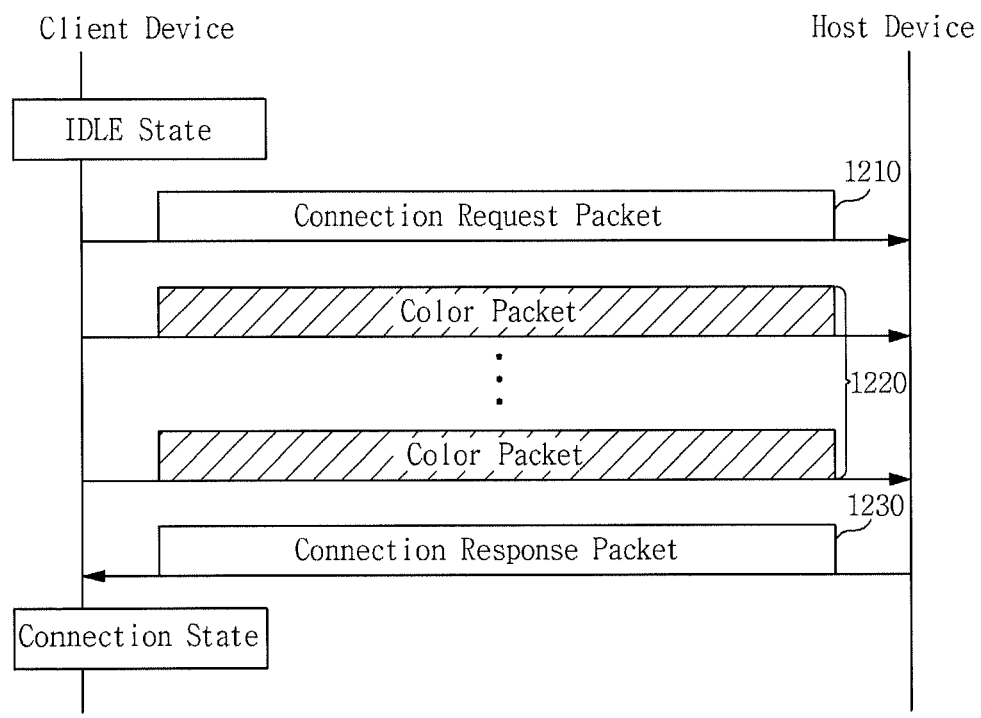
FIG. 12 is a diagram showing an example in which a color packet of a first color is transferred between an idle state and a connection state.

FIG. 12 is a diagram showing an example in which a color packet of a first color is transferred between an idle state and a connection state.

Referring to FIG. 12, a visible light communication device corresponding to a client device transfers a connection request packet 1210 and thereafter, before a visible light communication device corresponding to a host device transfers a connection response packet 1230, a color packet 1220 of a first color is transferred.

The color packet is a packet for providing intuitive information. In this case, the intuitive information is information which a user who watches visible light communication can distinguish by a color.

That is, the intuitive information is information distinguished depending on a wavelength in a visible light band.

For example, the intuitive information may be the channel state information, information indicating a communication status, or information indicating a file transfer status.

MAC states of the visible light communication may include an idle state, a connection state, and a data exchange state.

Figure 13:
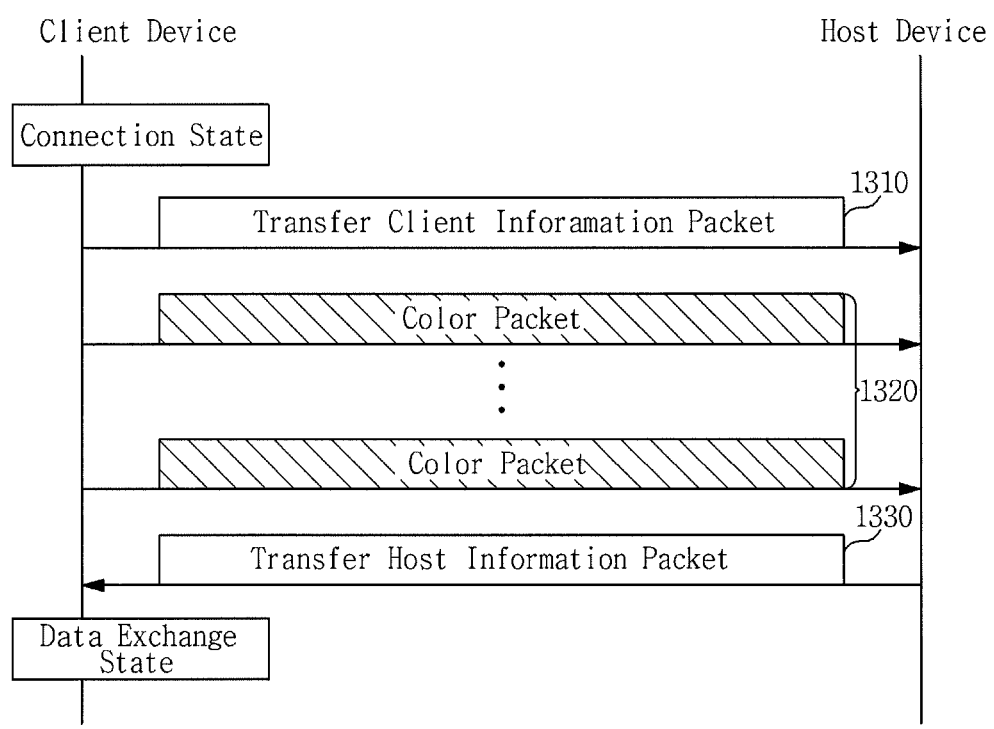
FIG. 13 is a diagram showing an example in which a color packet of a second color is transferred between a connection state and a data exchange state.

FIG. 13 is a diagram showing an example in which a color packet of a second color is transferred between a connection state and a data exchange state.

Referring to FIG. 13, the visible light communication device corresponding to the client device transfers a client information packet 1310 and thereafter, before the visible light communication device corresponding to the host device transfers a host information packet 1330, a color packet 1320 of a second color is transferred.

In this case, the second color is a color corresponding to a wavelength different from the first color and may be set to be distinguishable from the first color by a user's eye.

Figure 14:
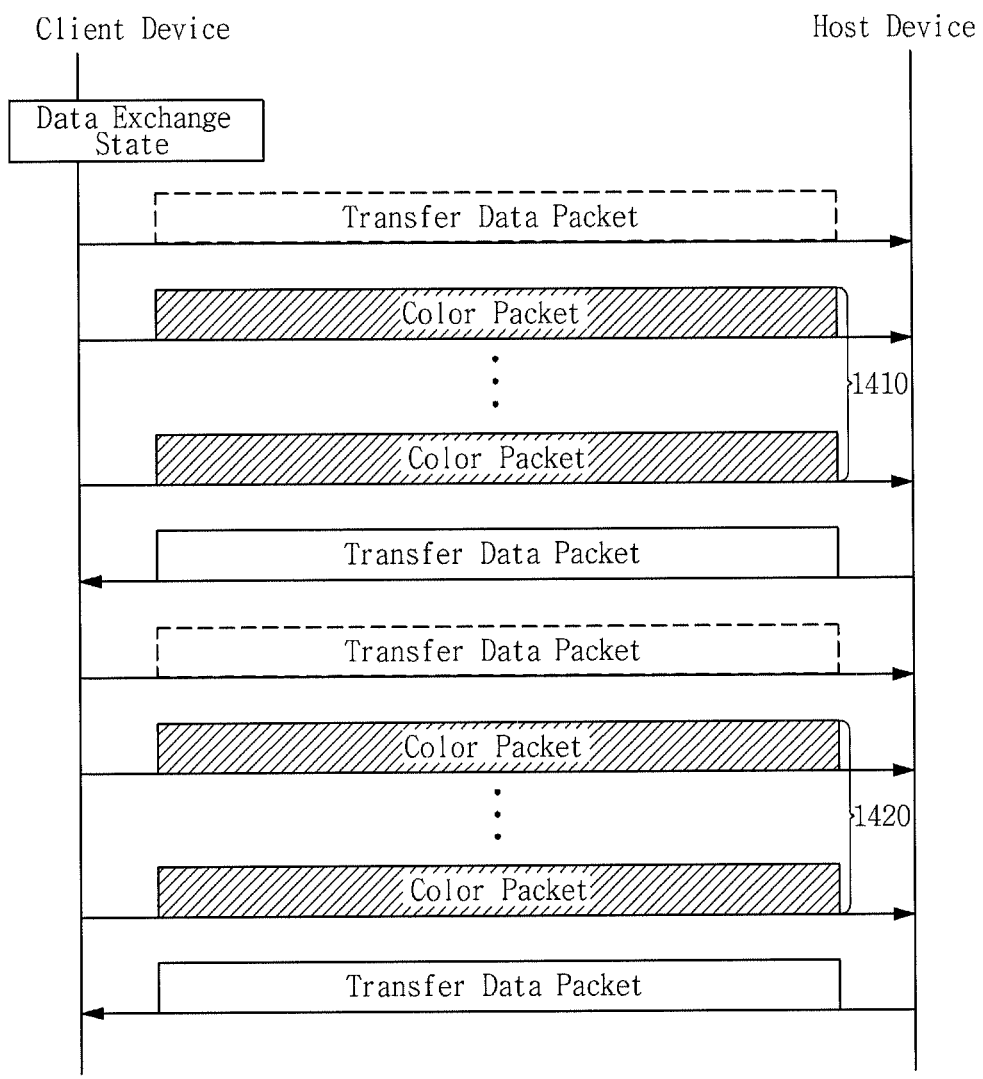
FIG. 14 is a diagram showing an example in which a color packet of a third color is transferred in a data exchange state.

FIG. 14 is a diagram showing an example in which a color packet of a third color is transferred in a data exchange state.

Referring to FIG. 14, color packets 1410 and 1420 of a third color are transferred during transferring data packets between the visible light communication device corresponding to the client device and the visible light communication device corresponding to the host device.

In this case, the third color is a color corresponding to a wavelength different from the first color and the second color and may be set to be distinguishable from the first color and the second color by the user's eye.

Figure 15:
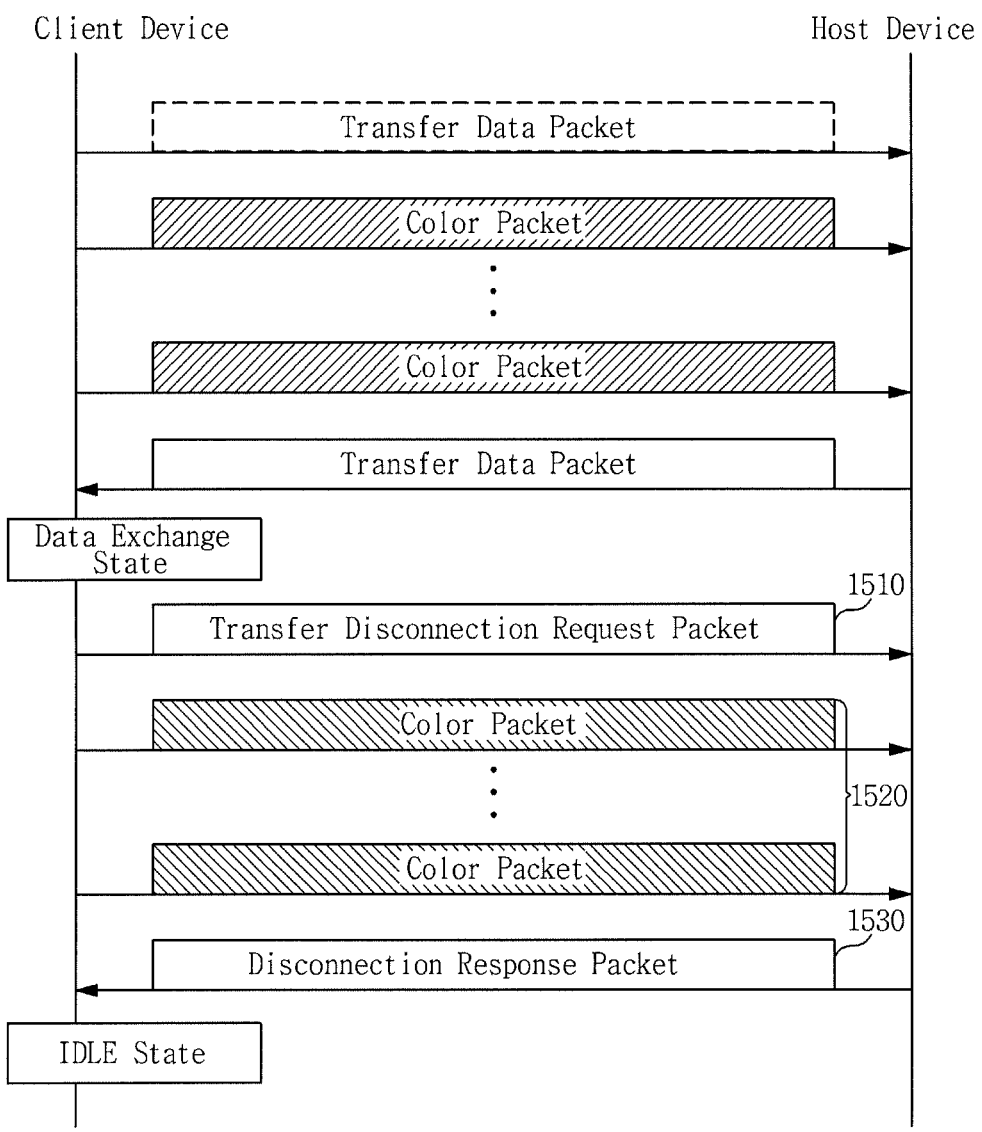
FIG. 15 is a diagram showing an example in which a color packet of a fourth color is transferred between a data exchange state and an idle state.

FIG. 15 is a diagram showing an example in which a color packet of a fourth color is transferred between a data exchange state and an idle state.

Referring to FIG. 15, the visible light communication device corresponding to the client device transfers a disconnection request packet 1510 and thereafter, before the visible light communication device corresponding to the host device transfers a disconnection response packet 1530, a color packet 1520 of a fourth color is transferred.

In this case, the fourth color is a color corresponding to a wavelength different from the first color, the second color, and the third color and may be set to be distinguishable from the first color, the second color, and the third color by the user's eye.

Figure 16:
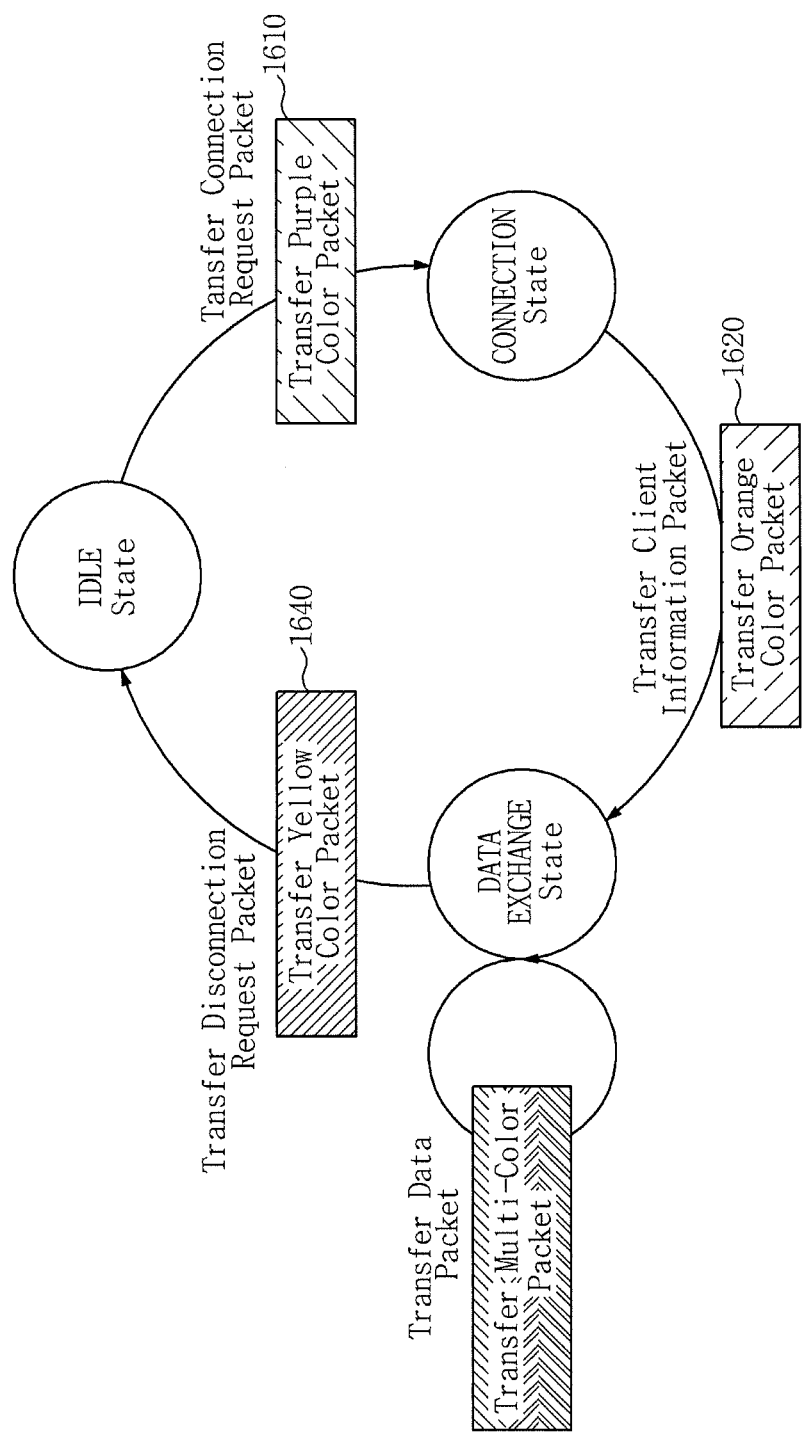
FIG. 16 is a state diagram showing an operation of a visible light communication device corresponding to a client device shown in FIGS. 12 to 15.

FIG. 16 is a state diagram showing an operation of a visible light communication device corresponding to a client device shown in FIGS. 12 to 15.

Referring to FIG. 16, the visible light communication device corresponding to the client device transfers the color packet 1610 of the first color at the time of transferring the connection request packet in the idle state to enable the user to know that a current communication status is a connection request step.

In an example shown in FIG. 16, the first color is a purple color.

Further, the visible light communication device corresponding to the client device transfers the color packet 1620 of the second color at the time of transferring the client information packet in the connection state to enable the user to know that the current communication status is between the connection state and the data exchange state.

In the example shown in FIG. 16, the second color is an orange color.

Further, the visible light communication device corresponding to the client device may transfer the color packet of the third color at the time of transmitting and receiving the data packet in the data exchange state. In this case, colors used to transmit and receive the data packet are mixed with the third color, such that the user may see multi-colors.

Further, the visible light communication device corresponding to the client device transfers the color packet 1640 of the fourth color at the time of transferring the disconnection request packet in the data exchange state to enable the user to know that the current communication status is between the data exchange state and the idle state.

In the example shown in FIG. 16, the fourth color is a yellow color.

Accordingly, the user may intuitively recognize the current communication status by using the color of the transferred color packet.

Figure 17:
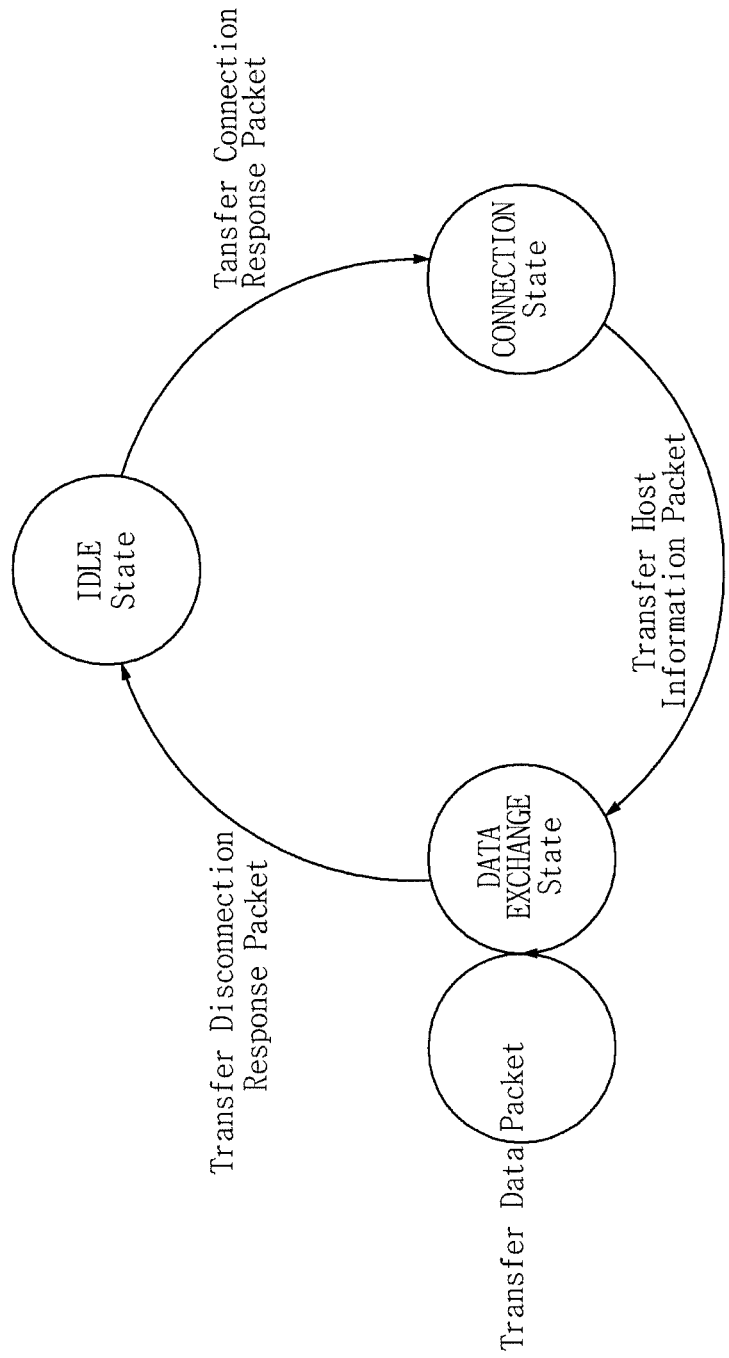
FIG. 17 is a state diagram showing an operation of a visible light communication device corresponding to a host device shown in FIGS. 12 to 15.

FIG. 17 is a state diagram showing an operation of a visible light communication device corresponding to a host device shown in FIGS. 12 to 15.

Referring to FIG. 17, the visible light communication device corresponding to the host device transfers the connection response packet in response to the connection request packet transferred from the visible light communication device corresponding to the client device in the idle state and is transitioned to the connection state.

Further, the visible light communication device corresponding to the host device transfers the host information packet in response to the client information packet transferred from the visible light communication device corresponding to the client device in the connection state and is transitioned to the data exchange state.

In addition, the visible light communication device corresponding to the host device transmits and receives the data packet in the data exchange state.

Besides, the visible light communication device corresponding to the host device transfers the disconnection response packet in response to the disconnection request packet transferred from the visible light communication device corresponding to the client device in the data exchange state and is transitioned to the idle state.

Figure 18:
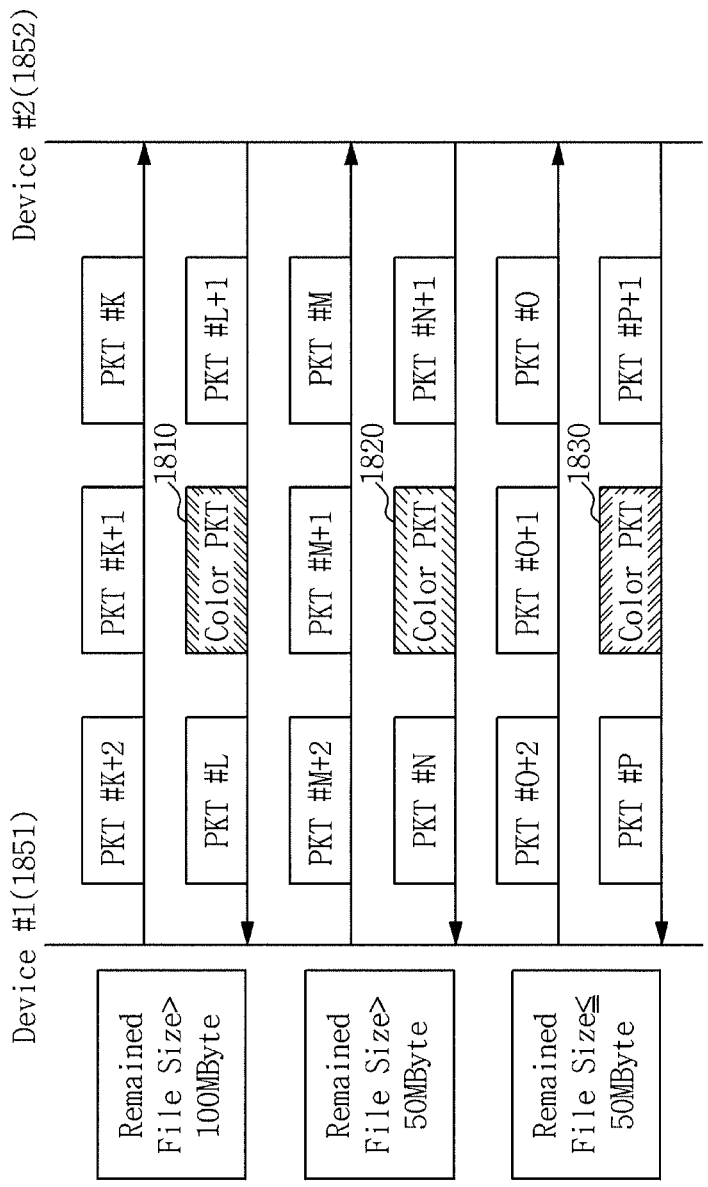
FIG. 18 is a diagram showing an example in which a color packet is used in a file transfer application.

FIG. 18 is a diagram showing an example in which a color packet is used in a file transfer application.

Referring to FIG. 18, when the data packet is transmitted and received through visible light communication between two devices 1851 and 1852, if the size of the remaining file is larger than 100 MByte on the basis of the device 1852, the color packet 1810 of the first color is transferred from the device 1852.

Further, if the size of the remaining file is between 50 MByte and 100 MByte on the basis of the device 1852, the color packet 1820 of the second color is transferred from the device 1852.

In addition, if the size of the remaining file is 50 MByte or less on the basis of the device 1852, the color packet 1830 of the third color is transferred.

Accordingly, the user may intuitively recognize a file current transfer state by using the color of the transferred color packet.

Figure 19:
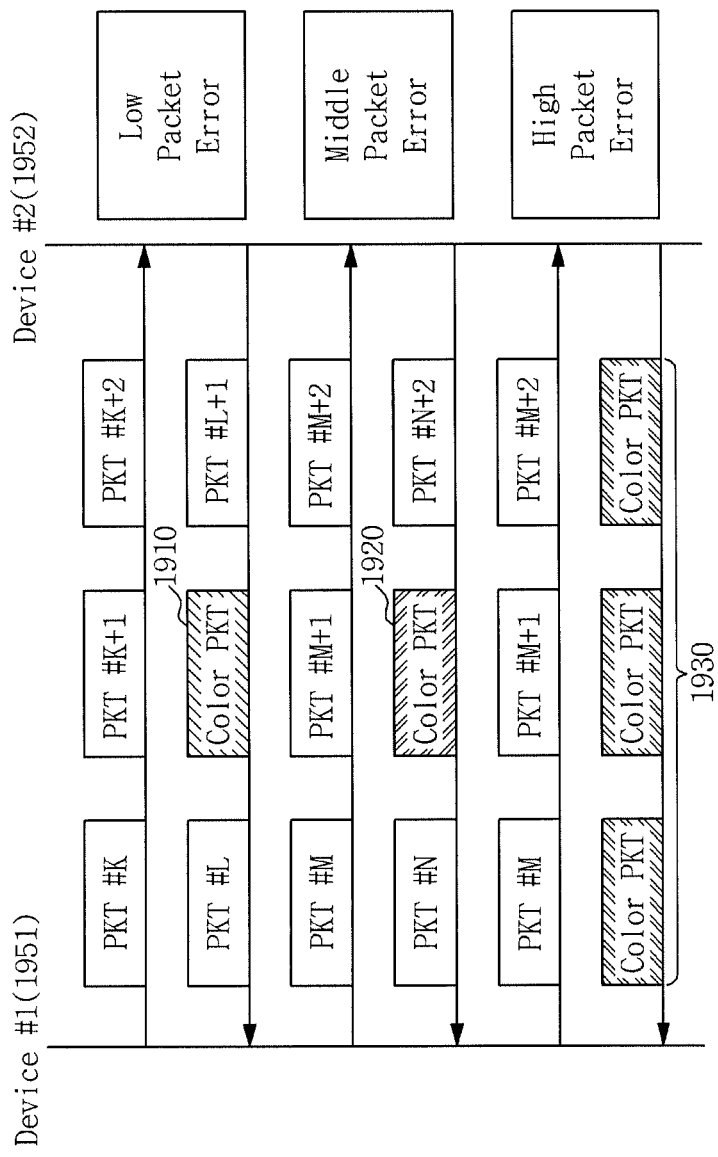
FIG. 19 is a diagram showing an example in which a color packet is used for recognition of a channel state.

FIG. 19 is a diagram showing an example in which a color packet is used for recognition of a channel state.

Referring to FIG. 19, when the data packet is transmitted and received through visible light communication between two devices 1951 and 1952, if channel state information measured by the device 1952 is judged as a low packet error state, the color packet 1910 of the first color is transferred from the device 1952.

In addition, if the channel state information measured by the device 1952 is judged as a middle packet error state, the color packet 1920 of the second color is transferred from the device 1952.

Further, if the channel state information measured by the device 1952 is judged as a high packet error state, the color packets 1930 of the third color is transferred from the device 1952.

In this case, from the first color packet to the third color packet, the packet may be transferred by a light source having a wavelength with better transmission characteristic.

For example, if a light source having the best transmission characteristic is a red light source, a light source having the second best is a green light source, and a light source having the third best transmission characteristic is a blue light source, the first color may be a blue color, the second color may be a green color, and the third color may be a red color.

Furthermore, if the channel state information is judged as the high packet error state, the channel state is poor and thus, the data transmission may be voided. In this case, a plurality of color packets may be transferred instead of the data packet.

For example, since the blue color packet has a good channel state, the blue color packet may represent a change to a high-speed modulation scheme, since the red color packet has a middle channel state, the red color packet represents sustaining of a modulation scheme, and since the red color packet has a poor channel state, the red color packet may represent a change to a low-speed modulation scheme.

Figure 20:
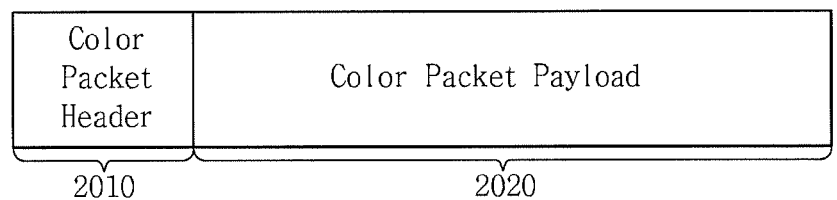
FIG. 20 is a diagram showing a color packet according to an embodiment of the present invention.

FIG. 20 is a diagram showing a color packet according to an embodiment of the present invention.

Referring to FIG. 20, the color packet includes a color packet header 2010 and a color packet payload 2020.

The color packet header 2010 may include a color packet indictor (CPI) and/or a peer device information indicator.

The color packet payload 2020 may include a dummy color packet pattern or transmission information.

A color packet including the dummy color packet pattern may be indicated by the color packet indicator in the color packet header 2010 and a color packet including the transmission information may be indicated by the peer device information indicator in the color packet header 2010.

Therefore, when a receiving side receiving the color packet detects the color packet indicator by using the color packet header 2010, a receiving-side device may judge that it is not necessary to receive the color packet payload 2020.

When the receiving side receiving the color packet detects the color peer device information indicator by using the color packet header 2010, the receiving-side device may judge that it is necessary to receive the color packet payload 2020.

Figure 21:
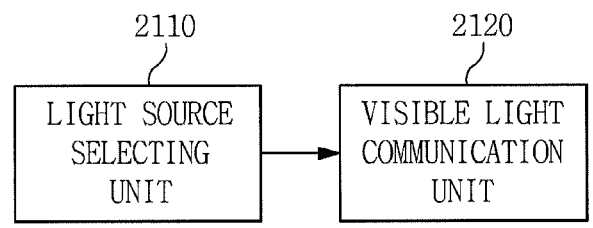
FIG. 21 is a block diagram of a visible light communication device according to an embodiment of the present invention.

FIG. 21 is a block diagram of a visible light communication device according to an embodiment of the present invention.

Referring to FIG. 21, the visible light communication device according to the embodiment of the present invention includes a light source selecting unit 2110 and a visible light communication unit 2120.

The light source selecting unit 2110 selects at least one light source of the plurality of light sources generating lights having different wavelengths by considering the intuitive information distinguishable depending on the wavelength in the visible light band.

The visible light communication unit 2120 performs visible light communication by at least one selected light source to allow the intuitive information to be recognized by a color corresponding to at least one selected light source.

In this case, the intuitive information may be transmitted using the color packet.

In this case, the color packet may include a color packet header and a color packet payload.

In this case, the color packet payload of the color packet may include any one of a dummy color packet pattern and transmission information.

In this case, the color packet including the dummy color packet pattern may be indicated by the color packet indicator in the color packet header and the color packet including the transmission information may be indicated by the peer device information indicator in the color packet header.

In this case, the intuitive information may be channel state information generated based on the received signal characteristic.

In this case, the light source selecting unit may increase the number of light sources to be used for the light visible communication as the channel state is better and decrease the number of light sources to be used for the visible light communication as the channel state is worse.

In this case, the light source selecting unit may add the light source to be used for the visible light communication among the plurality of light sources in accordance with the priority set according to the receiving sensitivity order at the time of increasing the number of light sources to be used for the visible light communication.

In this case, the light source selecting unit may disable a light source having the received signal characteristic which does not satisfy a predetermined reference value among the light sources to be used for the visible light communication.

In this case, the received signal characteristic may be at least one of the Received Signal Strength Indication (RSSI) and the Packet Error Rate (PER).

In this case, the intuitive information may be generated using at least one of the strength of the received signal received from the light source of the visible light communication transmitter and the strength of the interference signal received from an adjacent light source.

In this case, the intuitive information may be differently determined depending on the grade of the strength of the received signal or the strength of the interference signal.

In this case, the intuitive information may be information indicating a communication status of the visible light communication.

In this case, the intuitive information may be transmitted between the idle state and the connection state, between the connection state and the data exchange state, and between the data exchange state and the idle state.

In this case, the intuitive information may be information indicating a file transfer status.

In this case, the intuitive information may be transmitted through the light source having the wavelength within the visible light band, which is different for each transmission rate of the file.

Figure 22:
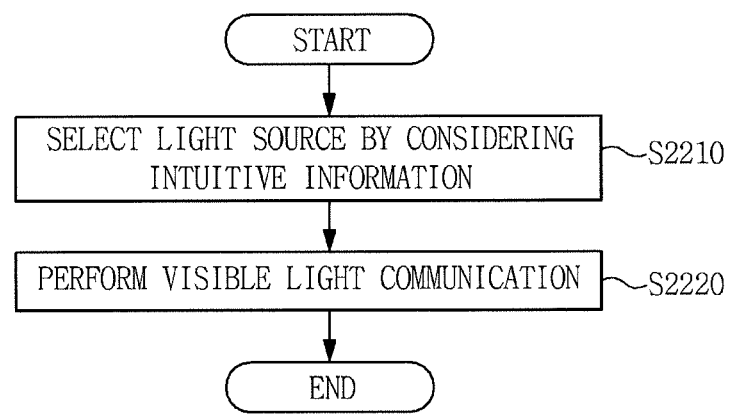
FIG. 22 is an flowchart showing a visible light communication method according to an embodiment of the present invention.

FIG. 22 is an flowchart showing a visible light communication method according to an embodiment of the present invention.

Referring to FIG. 22, in the visible light communication method according to the embodiment of the present invention, a visible light communication transmitter selects at least one light source of a plurality of light sources generating lights having different wavelengths by considering intuitive information distinguishable depending on a wavelength in a visible light band (S2210).

In this case, intuitive information is transmitted using a color packet. The color packet includes a color packet header and a color packet payload. The color packet payload may include any one of a dummy color packet pattern and transmission information.

In this case, the color packet including the dummy color packet pattern may be indicated by a color packet indicator in the color packet header and the color packet including the transmission information may be indicated by a peer device information indicator in the color packet header.

Further, in the visible light communication method, the visible light communication transmitter performs visible light communication by at least one selected light source to allow the intuitive information to be recognized by a color corresponding to at least one selected light source (S2220).

In this case, the intuitive information may be any one of channel state information, information representing the communication status of the visible light communication, and information representing a file transfer status that are generated based on the received signal characteristic.

As described above, an apparatus and a method for visible light communication according to the present invention are not limited to the configuration and method of the embodiments as described above, but the embodiments may be configured by selectively combining all the embodiments or some of the embodiments so that various modifications can be made.

What is claimed is:

1. An apparatus for a visible light communication, comprising:
a light source selecting unit selecting a light source for representing a color corresponding to a status of the apparatus for the visible light communication; and
a visible light communication unit providing light corresponding to the color for a user to recognize the status visually,
wherein the status includes at least a file transfer status of a communication status, channel status and file transfer status of the visible light communication, wherein the file transfer status is one of three statuses each of which corresponds to different file transmission rate of a file to be transferred, wherein the status includes at least the channel status of the communication status, the channel status and the file transfer status of the visible light communication, and wherein the channel status is one of three statuses each of which corresponds to a different error rate.

2. The apparatus of claim 1, wherein the light source selecting unit selects the light source corresponding to:
   a first color when the file transfer status corresponds to a low transmission rate status among the three statuses;
   a second color when the file transfer status corresponds to a middle transmission rate status among the three statuses; and
   a third color when the file transfer status corresponding to a high transmission rate status among the three statuses.

3. A method of a visible light communication, comprising:
   selecting a light source for representing a color corresponding to a status of an apparatus performing the visible light communication; and
   providing light corresponding to the color for a user to recognize the status visually,
   wherein the status includes at least a file transfer status of a communication status, channel status and file transfer status of the visible light communication,
   wherein the file transfer status is one of three statuses each of which corresponds to different file transmission rate of a file to be transferred,
   wherein the status includes at least the channel status of the communication status, the channel status and the file transfer status of the visible light communication, and
   wherein the channel status is one of three statuses each of which corresponds to a different error rate.

4. The method of claim 3, wherein the selecting the light source for representing the color, selects the light source corresponding to:
   a first color when the file transfer status corresponds to a low transmission rate status among the three statuses;
   a second color when the file transfer status corresponds to a middle transmission rate status among the three statuses; and
   a third color when the file transfer status corresponding to a high transmission rate status among the three statuses.

* * * * *